(12) United States Patent
Mendoza et al.

(10) Patent No.: US 6,286,877 B1
(45) Date of Patent: Sep. 11, 2001

(54) DUAL SEAL PIPE COUPLING

(75) Inventors: Rick Mendoza, Chino Hills; Mark M. Ensworth, Orange; David V. Evans, Fountain Valley, all of CA (US)

(73) Assignee: Anthony Manufacturing Corp. Industrial Prod. Div., Azusa, CA (US)

( * ) Notice: Subject to any disclaimer, the term of this patent is extended or adjusted under 35 U.S.C. 154(b) by 0 days.

(21) Appl. No.: 09/550,751

(22) Filed: Apr. 17, 2000

(51) Int. Cl.[7] ....................................... F16L 33/18
(52) U.S. Cl. .......................... 285/351; 285/924; 285/918
(58) Field of Search ................................. 285/351, 335, 285/305, 924, 918, 13, 14

(56) References Cited

U.S. PATENT DOCUMENTS

| | | | |
|---|---|---|---|
| 3,348,863 | * | 10/1967 | Rinker ................................. 285/351 |
| 4,627,644 | * | 12/1986 | Ekman ..................................... 285/3 |
| 4,707,000 | * | 11/1987 | Torgardh ............................... 285/305 |
| 5,292,156 | * | 3/1994 | Sasa et al. ............................. 285/23 |
| 5,845,944 | * | 12/1998 | Enger et al. ........................... 285/23 |

* cited by examiner

*Primary Examiner*—Lynne H. Browne
*Assistant Examiner*—Carlos Lugo
(74) *Attorney, Agent, or Firm*—Kelly Bauersfeld Lowry & Kelley, LLP

(57) ABSTRACT

An improved dual seal pipe coupling is provided of the type having matingly interfitting male and female pipe fittings formed on adjacent ends of a pair of conduit members, wherein at least one of a pair of seal rings is vented at low pressure to prevent pressure build-up and potential seal ring distortion or damage upon initial assembly of the pipe fittings. The seal rings are seated respectively within a pair of axially spaced-apart recessed grooves formed on one of the pipe fittings for slidably and sealingly engaging the other one of the pipe fittings upon assembly therewith. A bypass vent is formed in at least one of the seal ring grooves, to include a shallow recessed channel underlying the associated seal ring and leading axially to a smoothly curved and generally arch-shaped relief port formed in an outboard side wall of the seal ring groove. Upon initial assembly of the pipe fittings, when an incompressible fluid such as water is trapped at relatively low pressure between the pair of seal rings, the fluid can escape through the bypass vent to prevent seal ring distortion or damage. However, in the presence of higher fluid pressure, the seal ring resiliently conforms with and seals against the smoothly curved recessed relief port to prevent fluid escape.

17 Claims, 4 Drawing Sheets

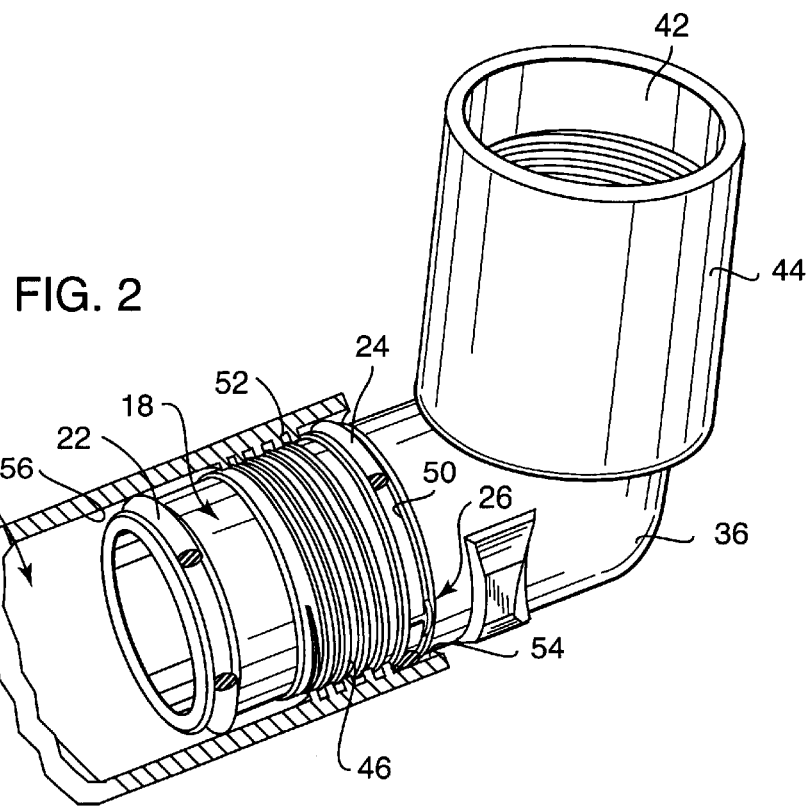
FIG. 2
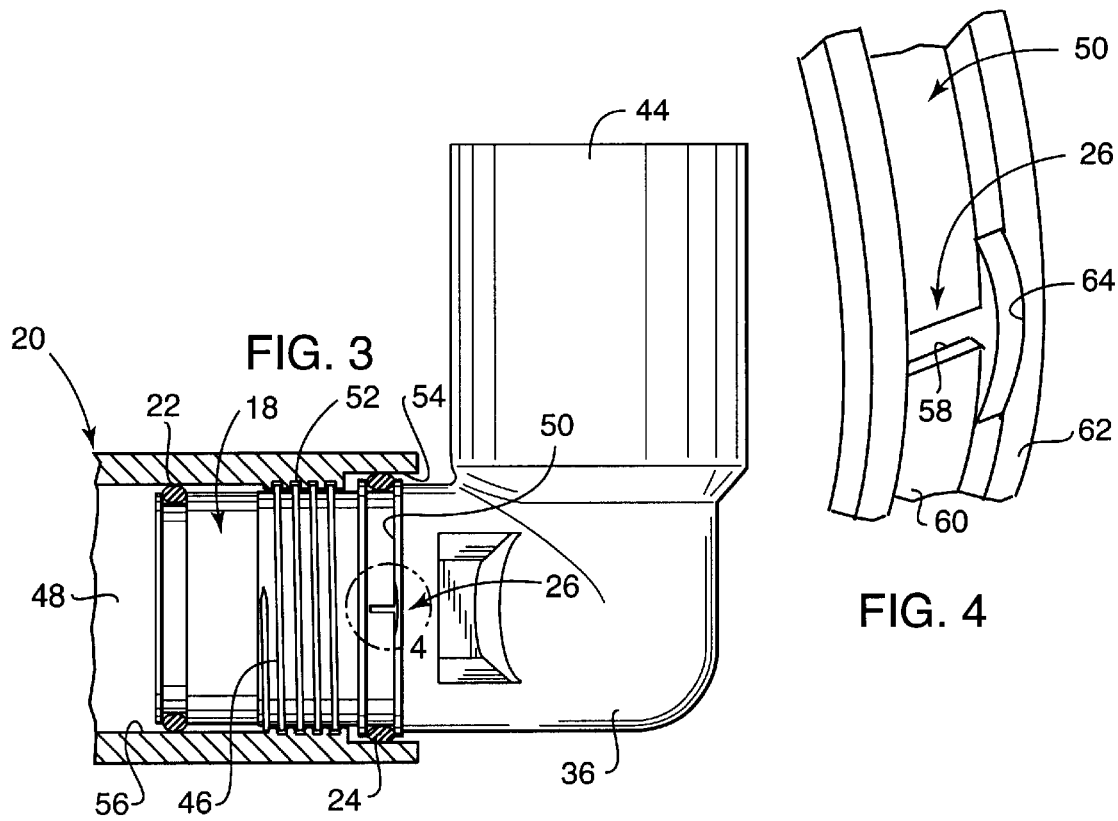
FIG. 3
FIG. 4

DUAL SEAL PIPE COUPLING

BACKGROUND OF THE INVENTION

This invention relates generally to improvements in pipe joints or pipe couplings of the type having a pair of axially spaced seals to provide a dual seal interface on a matingly interconnected pair of male and female pipe fittings. More particularly, this invention relates to an improved dual seal pipe coupling or joint wherein the inter-seal space is vented at low pressure to prevent seal distortion or damage upon assembly of the pipe fittings in the presence of an incompressible fluid such as water, but further wherein the dual seals provide a substantially leak-free interface in the presence of higher fluid pressure.

Pipe couplings for fluid handling applications are well known in the art, to include a matingly interfitting pair of typically male and female pipe fittings formed on adjacent ends of a pair of conduit members to form an elongated fluid flow path of a desired size and shape. In this regard, elongated conduits or pipes are commonly used in combination with specialized coupling members, such as sleeves, elbows and tees, to provide a custom-configured pipe network to deliver a selected fluid under pressure in gas or liquid form from one location to another. As one example, a typical irrigation system utilizes an array of elongated conduits or pipes assembled with appropriate elbows and tees and the like for delivering irrigation water from a water supply source to a plurality of individual sprinkler devices which distribute the irrigation water to a target terrain area and associated vegetation.

In many irrigation systems, the elongated conduits and associated coupling members are formed from a suitable plastic material for convenient slip-fit and adhesively secured interconnection. While this assembly technique provides a relatively simple leak-free coupling, subsequent rotation of the interconnected pipe components is prohibited. In some instances, such as the connection of a water supply line to an irrigation sprinkler, a so-called swing joint riser assembly is provided with a riser tube and one or more rotatable swing joints to accommodate post-assembly positional adjustment between the interconnected pipe components for orienting the riser tube and associated sprinkler relative to the surrounding terrain. For such swing joint couplings, threaded pipe fittings are typically employed. However, threaded pipe couplings must be tightly interconnected to prevent fluid leakage. Post-assembly rotational adjustment of the riser tube relative to the water supply line typically sets the threadably interconnected pipe components in a partially loosened condition such that some undesirable water leakage can occur.

To resolve leakage problems, swing joint pipe couplings have been developed with one or more seal rings such as resilient O-ring seals to prevent water leakage between the interfitted male and female pipe fittings. In one common design, the male pipe fitting includes a pair of seal rings seated respectively within a corresponding pair of recessed grooves formed at axially opposed ends of an external thread segment. These seal rings are diametrically sized and axially positioned to slidably and sealingly engage annular seal surfaces formed within a threaded bore of the associated female pipe fitting, when the male pipe fitting is threadably assembled therewith. The pair of seal rings provide a dual seal interface to prevent fluid leakage past the interengaged threads, notwithstanding post-assembly relative rotational adjustment between the interconnected male and female pipe fittings.

The dual seal pipe coupling as described above performs well when the pipe fittings are assembled in a dry environment, with fluid in the form of a compressible gas such as air disposed within the inter-seal space between the pair of seal rings. More particularly, as the pipe fittings are assembled, fluid is trapped within the inter-seal space between the axially spaced seal rings. When the trapped fluid comprises a compressible gas such as air, insufficient fluid pressure is generated within the inter-seal space to cause any significant extrusion type distortion or damage to either seal ring. However, when the trapped fluid is an incompressible liquid such as water, a substantial fluid pressure can be generated within the inter-seal space during assembly of the male and female pipe fittings, wherein this fluid pressure can cause undesirable distortion or damage to the seal rings. The presence of an incompressible liquid such as water within the inter-seal space is particularly likely in irrigation system applications since the pipe couplings are often assembled in-the-field in a wet environment.

The present invention provides an improved rotatably adjustable pipe coupling of the dual seal type, wherein fluid trapped within the interseal space at relatively low pressure during assembly of the pipe fittings is vented to prevent seal ring distortion or damage, but further wherein the dual seals provide a substantially leak-tight interface in the presence of higher fluid pressure during normal system operation.

SUMMARY OF THE INVENTION

In accordance with the invention, an improved dual seal pipe coupling is provided for interconnecting a pair of conduit members in a manner permitting substantially leak-free post-assembly rotational adjustment therebetween. The improved pipe coupling comprises a matingly interfitting pair of male and female pipe fittings formed on adjacent ends of the pair of conduit members, with one of the pipe fittings carrying an axially spaced pair of seal rings for slidably and sealingly engaging the other pipe fitting. At least one of the pair of seal rings is associated with a bypass vent for venting the inter-seal space axially between the seal rings at low pressure conditions during initial assembly of the pipe fittings, to prevent pressure build-up and potential seal ring distortion or damage. In the presence of relatively higher fluid pressure during normal operating conditions, this seal ring resiliently deforms to close the bypass vent and provide a substantially leak-free interface.

In a preferred form, the pipe fittings comprise male and female threaded pipe fittings. The seal rings are seated respectively within a pair of axially spaced-apart recessed grooves formed on one of the pipe fittings, such as on the male pipe fitting at axially opposite sides of an external thread segment formed thereon. These seal rings are respectively positioned for slidably and sealingly engaging annular seal surfaces formed on the other pipe fitting, such as a corresponding pair of annular seal lands formed within a threaded bore of the female pipe fitting at axially opposite sides of an internal thread segment formed therein. At least one of the seal ring grooves incorporates the bypass vent, to include a shallow recessed channel underlying the associated seal ring and extending axially to a smoothly curved and generally arch-shaped relief port formed in a side wall at an outboard or downstream pressure side of the seal ring groove.

Upon initial assembly of the pipe fittings, in the event that an incompressible fluid such as water is trapped at relatively low pressure within the inter-seal space between the pair of seal rings, this fluid can escape through the bypass vent to prevent seal ring distortion or damage. However, when subjected to higher fluid pressure such as during normal operating conditions, the seal ring associated with the bypass vent is pressure responsive for resiliently conforming with and sealing against the smoothly curved relief port to prevent fluid escape.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is an enlarged fragmented and perspective view corresponding generally with the encircled region 2 of FIG. 1, and illustrating the dual seal pipe coupling for rotatably and sealingly connecting an elbow pipe member with one end of a riser tube;

FIG. 3 is a side elevation view of the pipe coupling shown in FIG. 2, shown partially in section;

FIG. 4 is a further enlarged and fragmented perspective view of a portion of the pipe coupling, corresponding generally with the encircled region 4 of FIG. 3;

DETAILED DESCRIPTION OF THE PREFERRED EMBODIMENT

Figure 1:
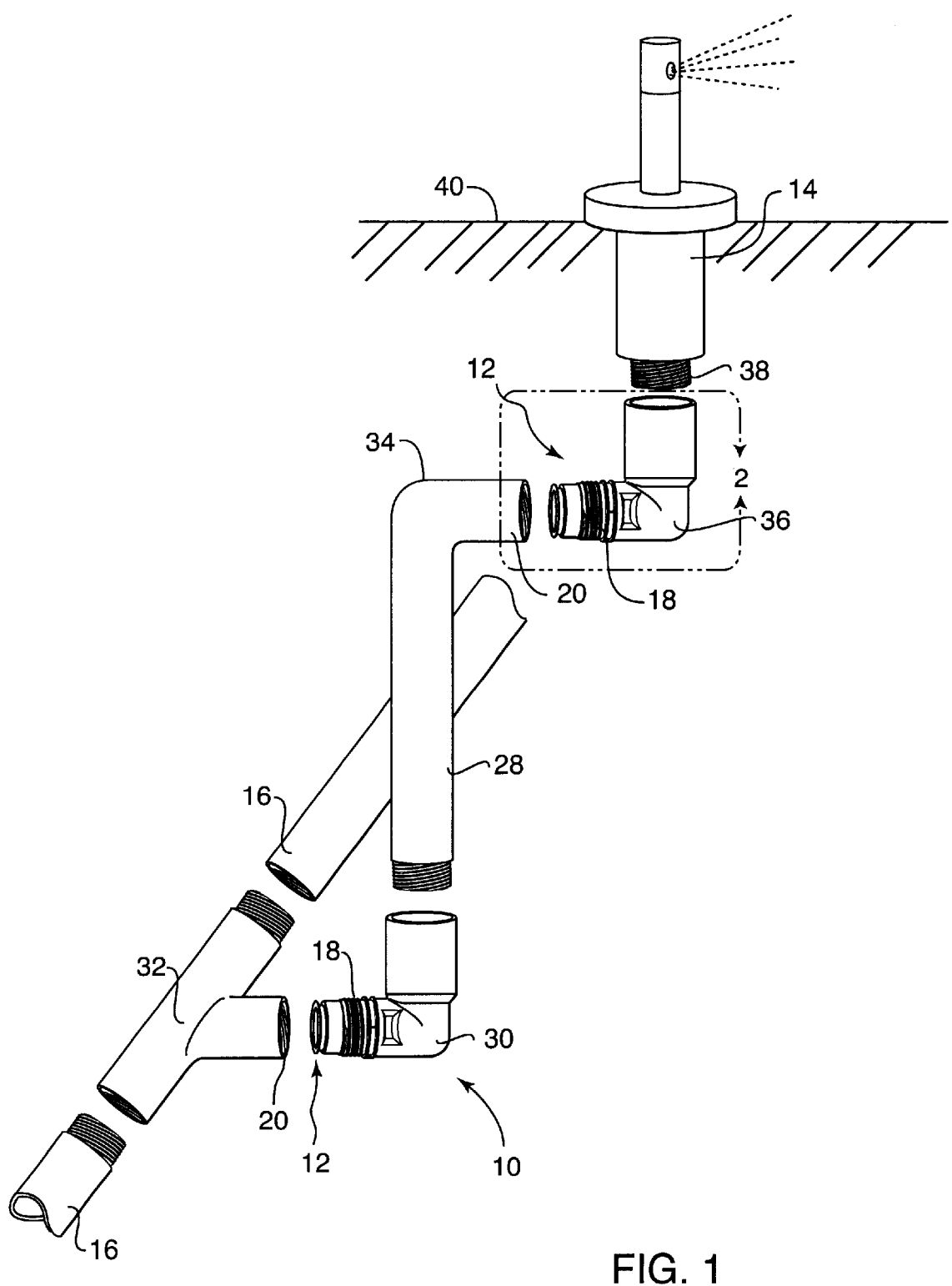
FIG. 1 is an exploded fragmented perspective view illustrating a swing joint riser assembly for coupling an irrigation sprinkler to a water supply line, wherein the swing joint riser assembly incorporates the dual seal pipe coupling of the present invention.

As shown in the exemplary drawings, a swing joint riser assembly referred to generally in FIG. 1 by the reference numeral 10 incorporates at least one and preferably a pair of improved dual seal pipe couplings 12 which accommodate post-assembly positional adjustment of an irrigation sprinkler 14 relative to a water supply line 16. Each dual seal pipe coupling comprises a matingly interfitted pair of male and female pipe fittings 18 and 20 interconnected as by a threaded interface or the like to accommodate post-assembly rotational adjustment therebetween. The inner or male pipe fitting 18 carries an axially spaced pair of seal rings 22 and 24 (FIGS. 2–3) for slidably and sealingly engaging the female pipe fitting 20 to provide a substantially leak-free connection. At least one of these seal rings 22, 24 is associated with a bypass vent 26 (FIGS. 2–4) to prevent pressure build-up and potential seal ring extrusion type distortion or damage upon initial assembly of the pipe fittings 18, 20, but resiliently deforms in the presence of relatively high pressure to close the bypass vent 26 and thereby provide a substantially leak-free interface during normal operating conditions.

The illustrative swing joint riser assembly 10 shown in FIG. 1 includes an elongated conduit member in the form of a riser tube 28 having a lower end coupled to a tubular elbow 30 which is coupled in turn to a tee fitting 32 mounted in-line along the length of the water supply line 16. An upper end of the riser tube 28 is shown to include a right angle turn 34 adapted for connection to another tubular elbow 36 which is connected in turn to an inlet fitting or nipple 38 on the irrigation sprinkler 14. The improved dual seal pipe coupling 12 of the present invention is provided in a preferred arrangement for interconnecting the lower elbow 30 at the bottom of the riser tube 28 to the tee fitting 32, and also for interconnecting the upper end of the riser tube 28 to the upper elbow 36 at the sprinkler 14. With this construction, the two dual seal pipe couplings 12 accommodate rotational adjustment of the riser tube 28 relative to the water supply line 16, as well as rotational adjustment of the upper elbow 36 relative to the riser tube 28, for purposes of adjusting the position of the sprinkler 14 with respect to the ground level 40 (FIG. 1), or alternately with respect to the height of surrounding vegetation to be irrigated.

In accordance with the invention, each dual seal pipe coupling 12 provides a substantially leak-free joint which can be assembled in a wet environment, in the presence of an incompressible liquid such as water disposed within the inter-seal space axially between the two seal rings 22, 24 (FIGS. 2–3), without generating pressure which could otherwise distort or damage either seal ring. In this regard, while the invention is shown and described for use in a swing joint riser assembly 10 in an irrigation system, it will be recognized and understood that the invention may be used in a range of different fluid handling environments. Moreover, it will be appreciated that the riser assembly 10 and the related water supply line 16 may be constructed as appropriate from molded or extruded plastic, or other suitable pipe materials.

FIGS. 2–8 illustrate construction details of the dual seal pipe coupling 12 for interconnecting the upper end of the riser tube 28 with the upper elbow 36, it being understood that the construction and operation of the second dual seal coupling 12 for interconnecting the lower elbow 30 with the supply line tee fitting 32 is the same. In this regard, the illustrative upper elbow 36 comprises a tubular pipe or conduit member defining a fluid flow passage 42 extending therethrough with a right angle turn. One end of the elbow 36 is configured to define the male pipe fitting 18, carrying the dual seal rings 22 and 24, whereas the opposite end of the elbow 36 is shown as an internally threaded female pipe fitting 44 for conventional thread-fit connection to the inlet nipple 38 (FIG. 1) on the sprinkler 14. Alternately, if desired, this female pipe fitting 44 on the elbow 36 may comprise a slip-fit female fitting for adhesive connection or the like to an adjacent slip-fit male pipe fitting.

The male pipe fitting 18 on the upper elbow 36 includes an external thread segment 46 disposed axially between a pair of recessed seal ring grooves 48 and 50. In the preferred form, the seal ring groove 48 is formed about the male pipe fitting 18 at a location generally adjacent a distal or free end thereof, and has a diametric size for receiving and supporting the seal ring 22. As shown best in FIGS. 2–3, this distal groove 48 and the associated seal ring 22 are sized so that the outermost surface of the seal ring 22 is disposed on a diameter which does not exceed and is desirably less than the outermost surface diameter of the male thread segment 46. By contrast, the other seal ring groove 50 is formed on the male pipe fitting 18 in a position axially opposite the distal groove 48, and has the other seal ring 24 seated therein. FIGS. 2–3 show the second groove 50 and the associated seal ring 24 sized so that the outermost surface of the seal ring 24 is at least equal to and desirably exceeds the outermost surface diameter of the male thread segment 46.

The female pipe fitting 20 is formed on the upper end of the riser tube 28. This female pipe fitting 20 comprises an open-ended sleeve defining an internal bore lined with an internal thread segment 52 for thread-on connection with the externally threaded male pipe fitting 18. A leading distal or free end of this bore defines a radially enlarged annular seal surface or land 54 for slidably and sealingly engaging the larger diameter seal ring 24 on the male pipe fitting 18. A second annular seal surface or land 56 is formed within the female pipe fitting 20 in a position axially opposite the distal land 54, and has a radial size for slidably and sealingly engaging the smaller diameter seal ring 22. Accordingly, the two pipe fittings 18, 20 can be threadably interconnected quickly and easily by rotatably advancing the male pipe fitting 18 into the female pipe fitting 20 with the respective thread segments 46 and 52 interengaged, and with the dual seal rings 22, 24 respectively sealing against the associated seal lands 56 and 54.

In the assembled state, the flow passage 42 through the male pipe fitting 18 is coaxially aligned with a flow passage formed in the female pipe fitting 20 for uninterrupted fluid flow through the pipe components. The smaller seal ring 22 comprises a primary seal structure at an inboard side of the inter-seal space to prevent fluid leakage to the threaded interface and further toward the exterior of the pipe coupling 12. The larger seal ring 24 functions to restrict ingestion of dirt and the like from the exterior of the pipe coupling to the threaded interface, while additionally providing a secondary or back-up seal structure to prevent water leakage from the flow passage to the coupling exterior in the event of primary seal failure. Importantly, the two seal rings 22, 24 accommodate post-assembly rotational adjustment of the pipe fittings 18, 20 relative to each other, without disrupting the sealed nature of the pipe coupling.

The bypass vent 26 is formed in one of the seal ring grooves 48, 50 to accommodate relatively low pressure leakage past the associated seal ring during assembly of the male and female pipe fittings 18 and 20. In the preferred form, the bypass vent 26 is formed in the seal ring groove 50 located at the outboard end of the inter-seal space in associated with the secondary seal ring 24, when the two pipe fittings are assembled. As shown best in FIGS. 4 and 6, the bypass vent comprises an axially elongated recessed channel 58 formed in a base wall 60 of the seal ring groove 50. This recessed channel 58 has a sufficient axial length to span the circular cross section of the associated seal ring 24 (FIG. 6) to permit fluid leakage in an outboard direction axially beneath and past the seal ring 24. The recessed channel 58 merges at one side wall 62 of the groove 50 generally into a mid-point of a smoothly curved and concavely recessed, generally arch-shaped relief port 64, thereby providing the bypass vent 26 with a generally T-shaped geometry. This arched relief port 64 is located at an outboard side or downstream pressure side of the groove 50 relative to the inter-seal space and forms the head of the T-shaped bypass vent 26.

In the course of assembly of the pipe coupling components, the thread segment 46 of the male pipe fitting 18 is rotatably engaged with and advanced into the thread segment 52 on the female pipe coupling 20, accompanied by displacement of the seal rings 22 and 24 respectively into slide-fit sealed engagement with the seal lands 56 and 54. As the outboard seal land 54 slides over the associated seal ring 24, the inter-seal space between the two seal rings 22, 24 is closed and sealed. In the event that an incompressible fluid such as water is trapped within this inter-seal space, further threaded advancement of the male pipe fitting 18 axially into the female pipe fitting 20 can apply pressure to the trapped liquid. The bypass seal 26 advantageously vents the inter-seal space during low pressure conditions such as assembly of the coupling components to prevent pressure-caused distortion or damage to either seal ring.

Figure 5:
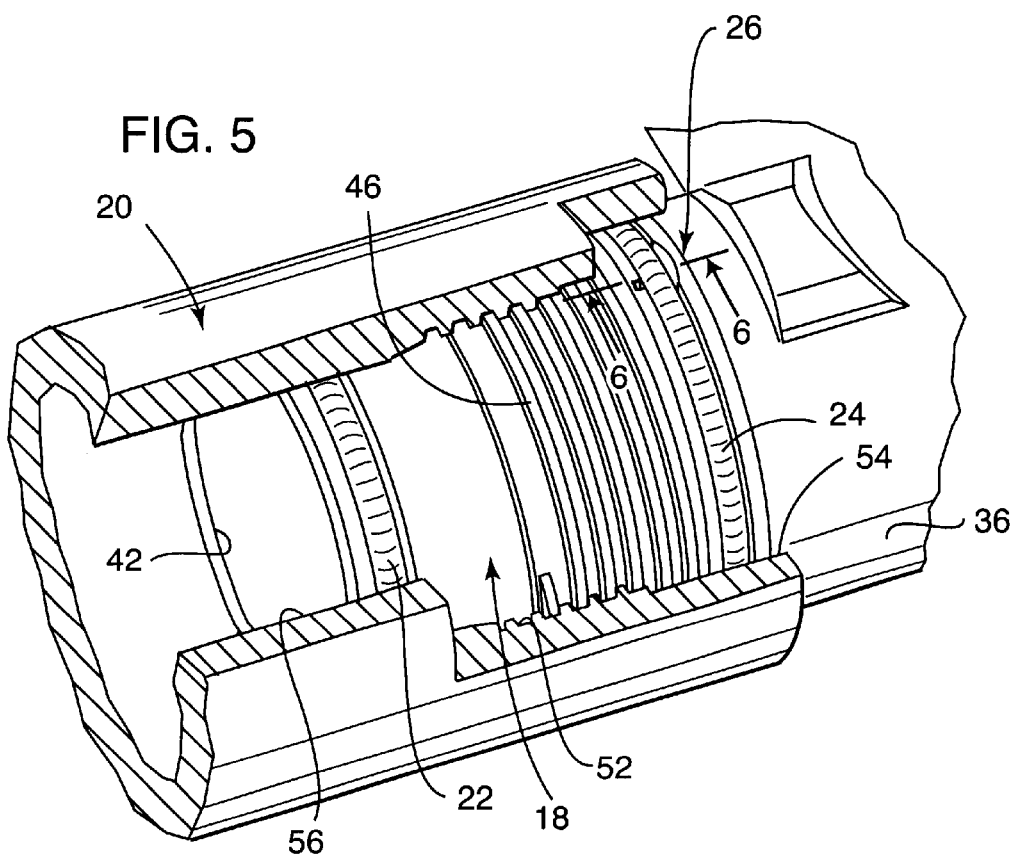
FIG. 5 is an enlarged and fragmented perspective view of the assembled dual seal pipe coupling, shown partially in section, and illustrating the pipe coupling in a normal position for venting the inter-seal space between a pair seal rings.
Figure 6:
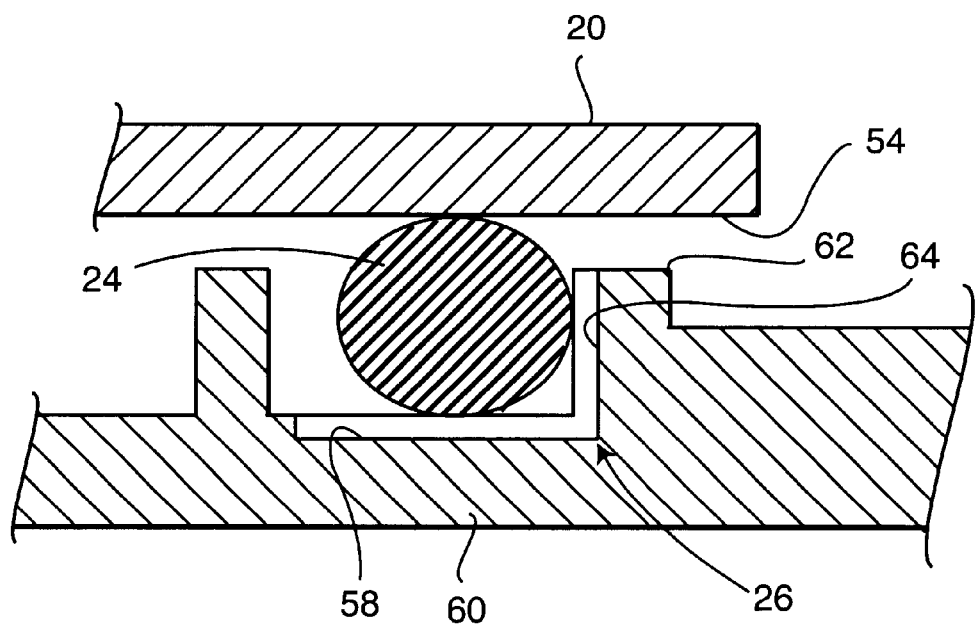
FIG. 6 is an enlarged fragmented sectional view taken generally on the line 6—6 of FIG. 5.

More particularly, when fluid trapped in the inter-seal space is subjected to relatively low pressure, as would occur during assembly of the pipe coupling components, water can leak beneath the seal ring 24 through the recessed channel 58 and further through the arched relief port 64 to the exterior of the coupling as viewed in FIGS. 5 and 6. However, upon subsequent exposure of the seal ring 24 to a higher fluid pressure, such as the pressure of water supplied through the riser assembly 10 to the sprinkler 14 during normal operation, the resilient seal ring 24 will pressure-deform into mating conformance with the arched relief port 64 and thereby close the bypass vent 26 (as viewed in FIGS. 7 and 8) to further fluid leakage. Such exposure of the seal ring 24 to higher pressure may occur, for example, upon failure of the primary seal ring 22 at the inboard end of the pipe coupling 12.

Figure 7:
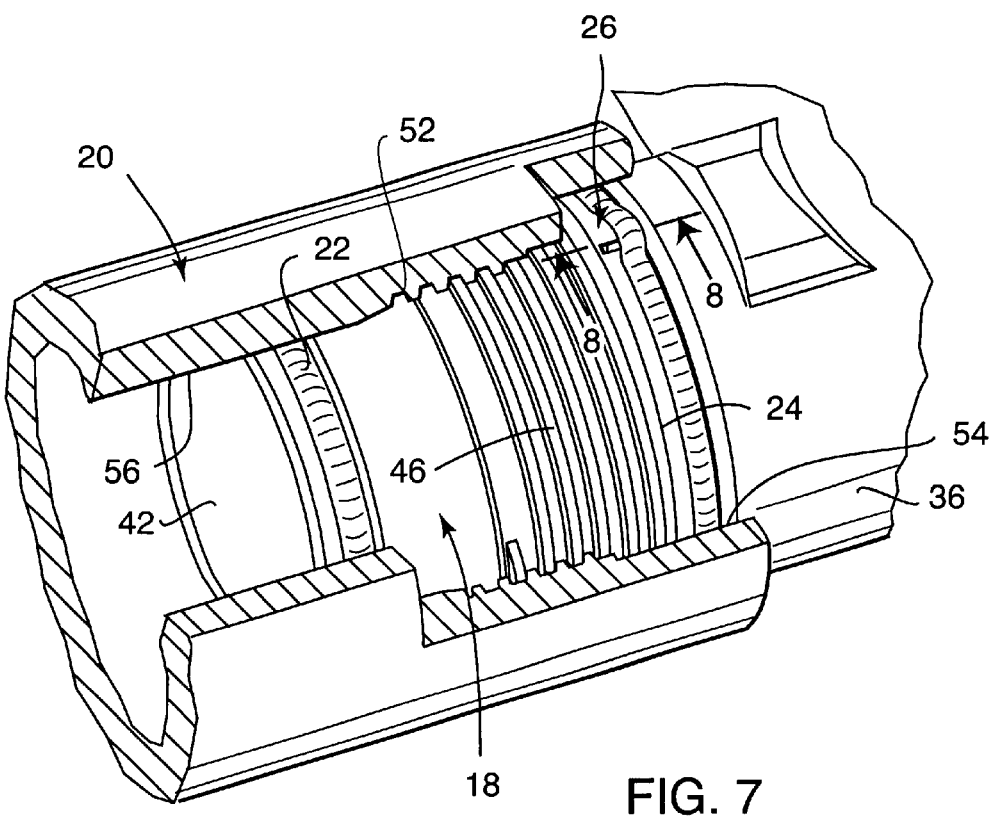
FIG. 7 is an enlarged and fragmented perspective view of the dual seal pipe coupling, similar to FIG. 5, but showing the pipe coupling in a position for sealing the inter-seal space between the pair of seal rings.
Figure 8:
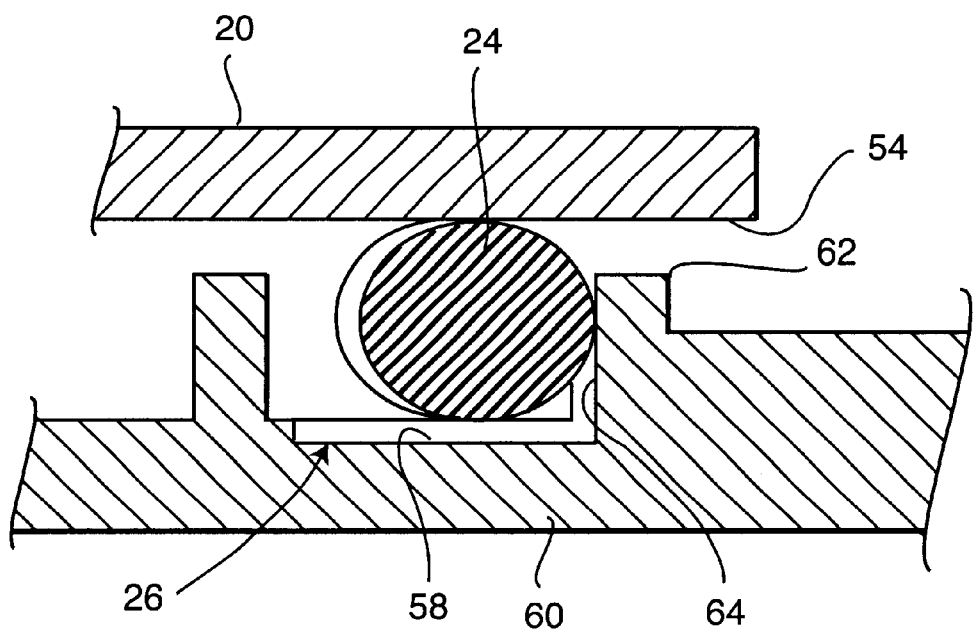
FIG. 8 is an enlarged fragmented sectional view taken generally off the line 8—8 of FIG. 7.

The specific curved concave or arched geometry of the relief port 64 can be tailored in relation to the size and stiffness of the associated seal ring 24 to regulate the fluid pressure level at which the seal ring transitions from the normal low pressure bypass mode (FIGS. 5–6) to the sealed mode (FIGS. 7–8). In this regard, as shown best in FIG. 4, the relief port 64 has an axial depth and radius of curvature sufficient to define a substantial open flow area which is at least equal to the open flow area of the channel 58 in the normal bypass mode. The pressure required for localized deformation of the seal ring 24 into sealing conformance with the arched relief port 64 can be increased by increasing the axial depth and/or by increasing the radius of curvature thereof.

The improved pipe coupling 12 of the present invention thus provides a dual seal pipe joint designed for post-assembly rotation of the interconnected pipe components substantially without permitting fluid leakage therebetween. This pipe coupling 12 is particularly suited for use in a swing joint riser assembly 10 of the type used in irrigation systems to accommodate post-assembly adjustments in the position of a sprinkler device coupled by the riser assembly to a water supply line. The pipe coupling accommodates assembly of interfitting male and female pipe fittings 18 and 20 in a wet environment, substantially without risk of seal ring damage or distortion attributable to trapping of liquid such as water within the inter-seal space.

A variety of modifications and improvements in and to the dual seal pipe coupling of the present invention will be apparent to those persons skilled in the art. For example, while the invention has been shown and described with the T-shaped bypass vent 26 associated with the outboard or secondary seal ring 24, it will be understood that the bypass vent may be alternately or additionally employed in association with the primary seal ring 22. In such application, the bypass vent 26 is oriented with the arched relief port 64 formed in a groove side wall at the downstream pressure side of the primary seal ring 22, axially between the seal ring 22 and the inter-seal space. As another example, it will be recognized that the seal rings 22, 24 may be mounted on the female pipe fitting 20 for slidably and sealingly engaging mating seal lands of the male pipe fitting. Moreover, the male and female pipe fittings 18, 20 may be adapted for interconnection by alternative nonthread connection means, such as a slip-fit and part-turn coupling arrangement. Accordingly, no limitation on the invention is intended by way of the foregoing description and accompanying drawings, except as set forth in the appended claims.

What is claimed is:

1. A dual seal pipe coupling, comprising:
   a pair of conduit members having interfitting male and female pipe fittings respectively formed thereon;
   an axially spaced pair of seal rings carried by one of said pipe fittings for slidably and sealingly engaging a corresponding pair of seal lands formed on the other of said pipe fittings, when said male and female pipe fittings are assembled in interfitting relation; and
   a bypass vent formed on said one of said pipe fittings in association with at least one of said seal rings for venting the axial space between said seal rings when the fluid pressure within said axial space is a relatively low pressure, said at least one of said seal rings being resiliently deformable in response to a relatively high fluid pressure within said axial space to close said bypass vent.

2. The dual seal pipe coupling of claim 1 wherein said pair of seal rings are seated respectively within a pair of axially spaced seal ring grooves formed on said one of said pipe fittings, and further wherein said bypass vent comprises a recessed channel extending axially within a base wall of one of said seal ring grooves and merging with a smoothly curved recessed relief port formed in a groove side wall disposed at a downstream pressure side thereof.

3. The dual seal pipe coupling of claim 2 wherein said one of said pipe fittings further includes a thread segment formed thereon at a position axially between said pair of seal ring grooves.

4. The dual seal pipe coupling of claim 1 wherein said male pipe fitting has an external thread segment formed thereon for threaded engagement with an internal thread segment formed within said female pipe segment.

5. The dual seal pipe coupling of claim 4 wherein said pair of seal rings are carried by said one of said pipe fittings at axially opposite sides of the thread segment formed thereon, and further wherein said pair of seal lands are formed on said other of said pipe fittings at axially opposite sides of the thread segment formed thereon.

6. The dual seal pipe coupling of claim 4 wherein said pair of seal rings are seated respectively within a pair of seal ring grooves formed on said male pipe fitting at axially opposite sides of the external thread segment formed thereon.

7. The dual seal pipe coupling of claim 6 wherein said bypass vent comprises a recessed channel extending axially within a base wall of one of said seal ring grooves and merging with a smoothly curved recessed relief port formed in a groove side wall disposed at a downstream pressure side thereof.

8. The dual seal pipe coupling of claim 7 wherein said recessed channel cooperates with said relief port to provide said bypass vent with a generally T-shaped configuration.

9. The dual seal pipe coupling of claim 7 wherein said one of said seal ring grooves is positioned at an outboard end of the pipe coupling.

10. A dual seal pipe coupling, comprising:
    an interfitting pair of male and female pipe fittings;
    means for interconnecting said pipe fittings in assembled relation with said male pipe fitting received into said female pipe fitting, said interconnecting means permitting relative rotation between said male and female pipe fittings;
    an axially spaced pair of seal rings carried respectively within an axially spaced pair of seal ring grooves formed on one of said pipe fittings for slidably and sealingly engaging a corresponding axially spaced pair of seal lands formed on the other of said pipe fittings, when said male and female pipe fittings are interconnected in assembled relation; and
    a bypass vent formed in one of said seal ring grooves for venting the axial space between said seal rings when the fluid pressure within said axial space is a relatively low pressure, said seal ring carried within said one of said seal ring grooves being resiliently deformable in response to a relatively high fluid pressure within said axial space to close said bypass vent.

11. The dual seal pipe coupling of claim 10 wherein said bypass vent comprises a recessed channel extending axially within a base wall of said one of said seal ring grooves and merging with a smoothly curved recessed relief port formed in a groove side wall disposed at a downstream pressure side thereof.

12. The dual seal pipe coupling of claim 11 wherein said recessed channel cooperates with said relief port to provide said bypass vent with a generally T-shaped configuration.

13. The dual seal pipe coupling of claim 10 wherein said interconnecting means is formed on said male and female pipe fittings, and further wherein said pair of seal ring grooves are formed on said one of said pipe fittings at axially opposite sides of said interconnecting means.

14. The dual seal pipe coupling of claim 10 wherein said one of said seal ring grooves is positioned at an outboard end of the pipe coupling.

15. The dual seal pipe coupling of claim 10 wherein said interconnecting means comprises an external thread segment formed on said male pipe fitting, and an internal thread segment formed on said female pipe fitting.

16. The dual seal pipe coupling of claim 15 wherein said pair of seal ring grooves are formed on said one of said pipe fittings at axially opposite sides of the thread segment thereon, and further wherein said pair of seal lands are formed on said other of said pipe fittings at axially opposite sides of the thread segment thereon.

17. The dual seal pipe coupling of claim 16 wherein said pair of seal ring grooves are formed on said male pipe fitting.

* * * * *